US010049357B2

(12) United States Patent
Kapur et al.

(10) Patent No.: US 10,049,357 B2
(45) Date of Patent: Aug. 14, 2018

(54) SYSTEM AND METHOD OF PROCESSING PIN-BASED PAYMENT TRANSACTIONS VIA MOBILE DEVICES

(71) Applicants: Shashi Kapur, Fort Lauderdale, FL (US); Ralph A. Bianco, Lagrangeville, NY (US)

(72) Inventors: Shashi Kapur, Fort Lauderdale, FL (US); Ralph A. Bianco, Lagrangeville, NY (US)

(73) Assignee: MTS Holdings, Inc., Purchase, NY (US)

( * ) Notice: Subject to any disclaimer, the term of this patent is extended or adjusted under 35 U.S.C. 154(b) by 0 days.

(21) Appl. No.: 14/685,702

(22) Filed: Apr. 14, 2015

(65) Prior Publication Data

US 2015/0324800 A1 Nov. 12, 2015

Related U.S. Application Data

(63) Continuation of application No. 13/624,262, filed on Sep. 21, 2012.

(51) Int. Cl.
*G06Q 20/00* (2012.01)
*G06Q 20/40* (2012.01)
*G06Q 20/38* (2012.01)
*G06Q 20/32* (2012.01)
*G06Q 20/20* (2012.01)
*G06Q 20/34* (2012.01)

(52) U.S. Cl.
CPC ....... *G06Q 20/4012* (2013.01); *G06Q 20/206* (2013.01); *G06Q 20/322* (2013.01); *G06Q 20/3227* (2013.01); *G06Q 20/341* (2013.01); *G06Q 20/382* (2013.01); *G06Q 20/40* (2013.01)

(58) Field of Classification Search
None
See application file for complete search history.

(56) References Cited

U.S. PATENT DOCUMENTS

| 4,405,829 | A  | * | 9/1983 | Rivest | H04L 9/302 |
| | | | | | 380/255 |
| 2007/0022058 | A1 | * | 1/2007 | Labrou | G06Q 20/32 |
| | | | | | 705/67 |

(Continued)

*Primary Examiner* — John Hayes
*Assistant Examiner* — Tim Hale
(74) *Attorney, Agent, or Firm* — Toering Patents PLLC (57) ABSTRACT

A system and method for using a Personal Identification Number ("PIN") to authenticate payment transactions via a mobile device coupled to a reader device is described. The reader device may be modified to not only read and encrypt first identification information from a payment medium such as a magnetic strip of a payment card, but also receive a PIN from the mobile device and encrypt the PIN. The mobile device may be configured to prompt for and receive the PIN. The PIN may be communicated to the reader device for encryption. The mobile device may receive the encrypted first identification information and encrypted PIN and communicate the encrypted data to an adaptive payment server that decrypts the encrypted data for processing the payment transaction. The system may be used to securely process PIN-based payment transactions using a mobile device that is communicably coupled to a reader device.

8 Claims, 7 Drawing Sheets

(56) References Cited

U.S. PATENT DOCUMENTS

| | | | |
|---|---|---|---|
| 2007/0100691 A1* | 5/2007 | Patterson | G06Q 20/40 |
| | | | 705/14.14 |
| 2007/0198432 A1* | 8/2007 | Pitroda | G06Q 20/02 |
| | | | 705/64 |
| 2011/0071949 A1* | 3/2011 | Petrov | G06Q 20/10 |
| | | | 705/72 |
| 2013/0078930 A1* | 3/2013 | Chen | H04M 1/03 |
| | | | 455/74 |
| 2013/0144792 A1* | 6/2013 | Nilsson | G06Q 20/20 |
| | | | 705/67 |

* cited by examiner

SYSTEM AND METHOD OF PROCESSING PIN-BASED PAYMENT TRANSACTIONS VIA MOBILE DEVICES

CROSS-REFERENCE TO RELATED APPLICATIONS

This application is a continuation of U.S. patent application Ser. No. 13/624,262, filed on Sep. 21, 2012, and entitled "System and Method of Processing PIN-Based Payment Transactions via Mobile Devices." This application is related to U.S. patent application Ser. No. 13/624,279, filed on Sep. 21, 2012, and entitled "System and Method of Processing Payment Transactions via Mobile Devices." Both of the aforementioned applications are herein incorporated by reference in their entirety.

FIELD OF THE INVENTION

The invention relates to processing payment transactions. In particular, the invention relates to processing PIN-based ("Personal Identification Number"-based) payment transactions using a mobile device.

BACKGROUND OF THE INVENTION

Secure payment transactions may use a predefined secret such as a Personal Identification Number (PIN). Such PIN-based authentication may require input of the PIN by the cardholder, typically via a PIN pad in brick-and-mortar location. An identity thief having possession of a card or card number authenticated using a PIN is thereby prevented from using the card without knowledge of the PIN.

In the United States, PIN-based authentication systems are widely deployed for debit payment transactions. However, debit payment transactions are generally performed using a PIN pad for input at brick-and-mortar retailers. As such, there exists a need for performing and processing secure debit payment transactions using a mobile device.

SUMMARY OF THE INVENTION

Various systems, computer program products, and methods for processing payment transactions via mobile devices are provided. According to various implementations of the invention, a method of processing a payment transaction via a mobile device may include receiving, from a reader device communicably coupled to the mobile device, encrypted first identification information, which identifies an account to be used for the payment transaction.

In some implementations of the invention, the method may include prompting for and receiving a PIN associated with the account. The PIN is used to authenticate the payment transaction. In some implementations of the invention, the method may include communicating the PIN to the reader device, where the PIN is encrypted. In some implementations of the invention, the method may include receiving, from the reader device, an encrypted PIN. In some implementations of the invention, the method may include communicating the encrypted first identification information and the encrypted PIN for processing the payment transaction.

In some implementations of the invention, a method for processing a payment transaction at an adaptive payment server using encrypted first identification information and encrypted PIN from a mobile device may include receiving, from the mobile device, encrypted first identification information that identifies an account, an amount of funds to transfer, and an encrypted PIN. In some implementations of the invention, the method may include decrypting the encrypted first identification information and the encrypted PIN. In some implementations of the invention, the method may include processing the payment transaction based on the decrypted first identification information and the decrypted PIN.

In some implementations of the invention, a method for encrypting first identification information and PIN at a reader device may include reading, from a tangible medium, first identification information associated with an account. In some implementations of the invention, the method may include encrypting the first identification information and communicating the encrypted first identification information to a mobile device. In some implementations of the invention, the method may include receiving, from the mobile device, a PIN. In some implementations of the invention, the method may include encrypting the PIN. Various encryption algorithms such as Triple DES and AES may be used. In some implementations of the invention, the method may include communicating the encrypted PIN to the mobile device.

DETAILED DESCRIPTION

Figure 1:
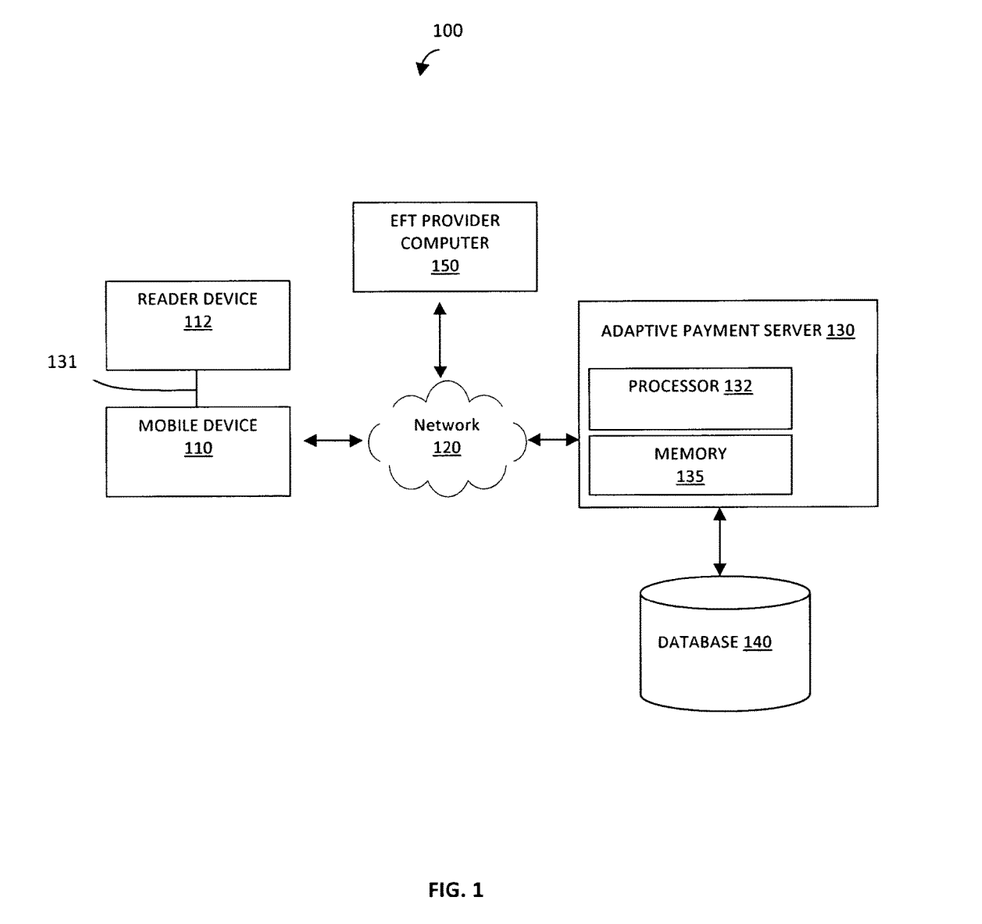
FIG. 1 is a block diagram illustrating an example of a system for processing debit payment transactions according to various implementations of the invention.

According to various implementations of the invention, various systems and methods may facilitate secure PIN-based payment transactions via mobile devices. FIG. 1 is a block diagram illustrating a system 100 for processing payment transactions via mobile devices, according to various implementations of the invention. In some implementations of the invention, system 100 may be used to process PIN-based payment transactions via a reader device removably attached to a mobile device. The reader device may read first identification information from a payment device (such as a debit card) and encrypt the first identification information for transmission by the mobile device. In some implementations, the mobile device is configured by instructions such as a mobile application to prompt for and receive second identification information (for example, PIN or other secret) and communicate the second identification information to the reader device for encryption. In these implementations, the mobile device leverages reader device hardware that includes encryption capabilities to secure not only the first identification information read from the payment device, but also second identification information input by a user via the mobile device. Upon receipt of the encrypted first identification information and the encrypted second identification information from the reader device, the mobile device may transmit the encrypted data to a server for processing a payment transaction.

According to various implementations of the invention, the first identification information may include, among other things, a credit card number, debit card number, a gift card number, a bank account number, or other identifier that identifies a financial account/payment account used for the payment transaction. The payment account may be associated with the payment device (for example, payment card). In some implementations, the first identification information may further include a name of the cardholder/account holder (such as a name of the user), a telephone number of the cardholder, a mailing address of the cardholder, and/or other information related to the payment transaction. The PIN may include a conventional four-digit predefined secret associated with the financial account or other secret information used to authenticate the payment transaction.

In some implementations, the first identification information can be stored using various tangible media such as, for example, a magnetic strip, a smart chip, a Radio Frequency Identification ("RFID") tag, other Near Field Communication ("NFC") tag, and/or other tangible medium that can be used to store and retrieve first identification information. In some implementations, the medium may be coupled to various payment devices, which can include, for example, a payment card, a key fob, a mobile device (such as a mobile device having an NFC tag), or other devices that can house or otherwise be used to carry the medium.

According to various implementations of the invention, the payment transaction may include, for instance, an online purchase, a funds transfer (for example, Electronic Funds Transfer ("EFT"), which involves electronically transferring funds or money from one account to another), and/or other transaction that transfers money from a financial account. According to various implementations of the invention, the payment transaction may include a balance inquiry. The balance inquiry includes a request to determine a balance of a financial account. The balance includes an actual amount of funds available rather than whether the amount of funds exceeds a particular purchase amount. For example, a balance inquiry may include determining an amount of funds available in an asset account and/or determining a credit available in a credit account. An asset account includes, without limitation, a checking account, a saving account, a money market account, a stock or bond account, or other account associated with assets. A credit account (i.e., debt account) can include, without limitation, a credit card account, a line of credit, or other account associated with credit or debt.

The foregoing are non-limiting examples associated with various implementations of the invention. Other uses and implementations of system 100 with respect to various system components will be apparent to those skilled in the art based on the description below.

According to various implementations of the invention, system 100 may include, but is not limited to, a mobile device 110, a reader device 112, a network 120, an adaptive payment server 130, a database 140, and an EFT provider computer 150. In some implementations of the invention, adaptive payment server 130, mobile device 110, EFT provider computer 150, and database 140 may be communicably coupled to one another via a network 120. Network 120 may include a Local Area Network, a Wide Area Network, a cellular communications network, a Public Switched Telephone Network, and/or other network or combination of networks.

According to various implementations of the invention, mobile device 110 may include a mobile computing/processing device such as a wireless phone, a personal digital assistant, a smart phone, a tablet computing device, and/or other portable computing device that may be utilized to communicate information with adaptive payment server 130. In some implementations, mobile device 110 may be used to perform secure PIN-based payment transactions.

In some implementations, reader device 112 and mobile device 110 may be communicably coupled to one another via a bi-directional link 131, which can include a wired (such as via Universal Serial Bus, headphone/multi-function jack, or other wired link) or wireless link (such as BLUETOOTH or other wireless link). In some implementations, reader device 112 may be connected to or plugged in the mobile device 110, wherein the reader device 112 may be configured to accept a payment device (for example, a payment card) associated with a user (account holder) performing a payment transaction. In some implementations, the reader device 112 may be plugged into a headphone/audio jack of the mobile device 110.

In some implementations of the invention, system 100 may process payment transactions by gathering encrypted first identification information and encrypted second identification from mobile device 110. In some implementations, for example, reader device 112 may obtain first identification information and encrypt the first identification information. In some implementations, reader device 112 may use Triple Data Encryption Algorithm (commonly known as "Triple DES"), Advanced Encryption Standard ("AES"), or other encryption techniques. In some implementations, reader device 130 uses Derived Unique Key Per Transaction ("DUKPT") key management to further enhance security.

In some implementations, mobile device 110 may receive the encrypted first identification information via link 131 for processing a payment transaction. In some implementations, mobile device 110 may receive second identification information (e.g., PIN). For example, instructions such as a mobile application may configure mobile device 110 to generate and display a user interface that prompts for and receives a PIN via soft and/or hard keys of the mobile device. Mobile device 110 may communicate the PIN via link 131 to reader device 112, where the PIN is encrypted. Mobile device 110 may receive the encrypted PIN via link 131 from reader device 112. In some implementations, reader device 112 uses the same encryption techniques to encrypt the first identification information and the PIN. In some implementations reader device 112 may use different encryption keys and/or techniques for encrypting the first identification information and the PIN. In some implementations, reader device 112 may receive the PIN and may encrypt a combination of the first identification information and the PIN.

In some implementations, reader device 112 may communicate the obtained first identification information to mobile device 110, wherein the mobile application may configure mobile device 110 to encrypt the obtained first identification information substantially immediately upon receipt. The mobile application may further configure the mobile device 110 to encrypt the PIN.

In some implementations, mobile device 110 communicates the encrypted first identification information and the encrypted second identification information to adaptive payment server 130 for processing the payment transaction. In some implementations, mobile device 110 directly communicates the encrypted first identification information and the encrypted second identification information to adaptive payment server 130. In these implementations, mobile device 110 may be communicably coupled to adaptive payment server 130 via network 120. In other implementations, mobile device 110 communicates the encrypted first identification information and the encrypted second identification information to adaptive payment server 130 via a separate client computing device (not otherwise illustrated in FIG. 1). In these implementations, mobile device 110 may be communicably coupled to the client computing device, which then communicates directly with adaptive payment server 130. The client computing device can include a desktop computing device or other hardware that is not ideally suited for mobility.

In some implementations of the invention, adaptive payment server 130 may receive the encrypted first identification information and the encrypted second identification information from mobile device 110. In some implementations, adaptive payment server 130 may decrypt the encrypted first identification information and the encrypted second identification information for processing the payment transaction.

In some implementations, mobile device 110 may include a processor (not otherwise illustrated in FIG. 1), circuitry, and/or other hardware operable to execute computer-readable instructions and/or mobile applications. In some implementations, mobile device 110 may execute a mobile application (not otherwise illustrated in FIG. 1) that is configured to receive the first identification information associated with the user when a payment device (for example, payment card) is swiped using the reader device 112. In other words, the reader device 112 may read the first identification information associated with the payment card, encrypt the first identification information, and provide the encrypted first identification information to the mobile application. In some implementations, the mobile application may cause the communication of the encrypted first identification information to adaptive payment server 130. In some implementations, mobile device 110 may include a memory (not otherwise illustrated in FIG. 1) that includes one or more tangible (i.e., non-transitory) computer readable media. The memory may include one or more instructions that when executed by the processor configures the processor to perform functions of mobile device 110/mobile application.

In some implementations, in response to receipt of the encrypted first identification information from reader device 112, mobile application may configure mobile device 110 to generate and display a user interface that prompts for and receives a PIN via soft and/or hard keys of the mobile device 110. Mobile device 110 may communicate the PIN to reader device 112. Reader device 112 may encrypt the PIN and provide the encrypted PIN to the mobile application. In some implementations, the mobile application may cause the encrypted PIN to be communicated to the adaptive payment server 130.

Figure 2A:
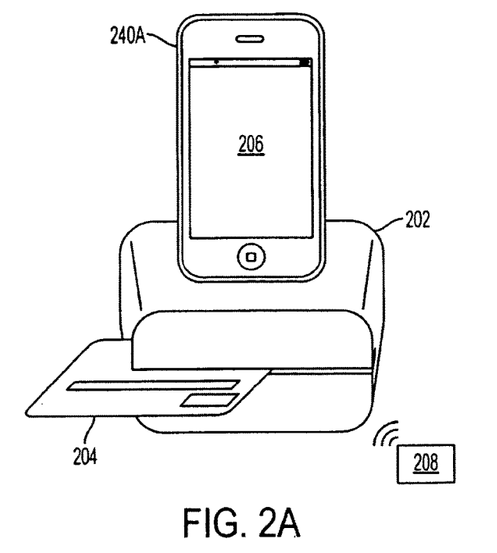
FIGS. 2A, 2B, and 2C are block diagrams illustrating exemplary reader devices and mobile devices, according to various implementations of the invention.

FIGS. 2A, 2B, and 2C depict exemplary reader devices for mobile devices, according to various implementations of the invention. According to various implementations of the invention, as illustrated in FIG. 2A, mobile device 240A may be coupled to a cradle style reader 202. In some implementations of the invention, cradle style reader 202 may include a magnetic strip reader (not illustrated) that is used to swipe a payment card 204. In some implementations of the invention, cradle style reader 202 may include a chip reader, NFC reader, or other reader that can read a smart chip, NFC tag, or other medium 208. In some implementations of the invention, medium 208 can include active or passive tags that can be read when placed on or near cradle style reader 202.

Figure 2B:
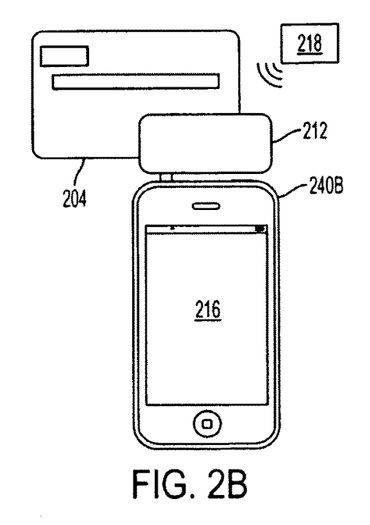

According to various implementations of the invention, as illustrated in FIG. 2B, mobile device 240B may be coupled to an attachment reader 212. In some implementations of the invention, attachment reader 212 may include a magnetic strip reader (not illustrated) that is used to swipe a payment card 214. In some implementations of the invention, attachment reader 212 may include a chip reader, NFC reader, or other reader that can read a smart chip, NFC tag, or other medium 218. In some implementations of the invention, medium 218 can include active or passive tags that can be read when placed on or near attachment reader 212.

Figure 2C:
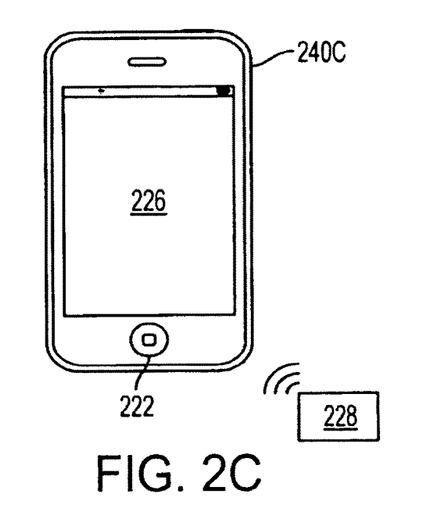

According to various implementations of the invention, as illustrated in FIG. 2C, mobile device 240C may include an integrated reader 222. In some implementations of the invention, integrated reader 222 may include a chip reader, NFC reader, or other reader that can read a smart chip, NFC tag, or other medium 228. In some implementations of the invention, medium 228 can include active or passive tags that can be read when placed on or near integrated reader 222.

Referring to FIG. 2 generally, mobile devices 240A, 240B, 240C may each include a user interface (illustrated in FIGS. 2A-2C as interfaces 206, 216, and 226). A user or other entity may download various instructions such as a mobile application to the mobile device 240. The instructions when executed by a processor (not illustrated in FIGS. 2A-2C) of the mobile device 240 causes the processor to generate interfaces 206, 216, and 226, which may be configured to receive first identification information from payment cards, chips, tags, input member input, etc., and/or prompt for second identification information (PIN or other secret). In some implementations of the invention, the mobile application may facilitate communication between the mobile device 240 and adaptive payment server 130, thereby allowing the mobile device 240 to be used to process a payment transaction.

According to various implementations of the invention, cradle style reader 202, attachment reader 212, and integrated reader 222 encrypts the first identification information read from various media and communicates the encrypted first identification information to mobile device 240. According to various implementations of the invention, cradle style reader 202, attachment reader 212, and integrated reader 222 receives a PIN or other secret that was input via mobile device 240 and encrypts the PIN. Cradle style reader 202, attachment reader 212, and integrated reader 222 may communicate the encrypted PIN to mobile device 240 for processing the payment transaction.

In some implementations of the invention, adaptive payment server 130 (illustrated in FIG. 1) may cause the mobile application to be downloaded to mobile device 240. For example, the instructions associated with the mobile application may be stored within memory 135 or other accessible memory location of adaptive payment server 130.

Referring back to FIG. 1, in operation, an account holder may be presented with mobile device 110 to process a payment transaction. Mobile device 110 is communicably coupled to reader device 112 and is configured by a mobile application for processing the payment transaction. The account holder may present a payment device such as a debit card and swipe or otherwise cause the payment device to be read by reader device 112. Reader device 112 obtains first identification information from the payment device, encrypts the first identification information, and communicates the encrypted first identification information to mobile device 110. Mobile device 110 presents an interface to prompt for and receive a PIN from the account holder. The account holder inputs the PIN using soft and/or hard keys of mobile device 110. Mobile device 110 communicates the PIN to reader device 112, which encrypts the PIN and communicates the encrypted PIN to mobile device 110. Mobile device 110 communicates the encrypted first identification information and the encrypted PIN to adaptive payment server 130 for processing the payment transaction.

In some implementations, the account holder is a person or other entity that is a payment cardholder, a user using the system to make a payment, a user using the system to transfer funds, and/or other person or entity using the system to process a payment transaction. Those having skill in the art will appreciate that the invention described herein may work with various system configurations.

Figure 3:
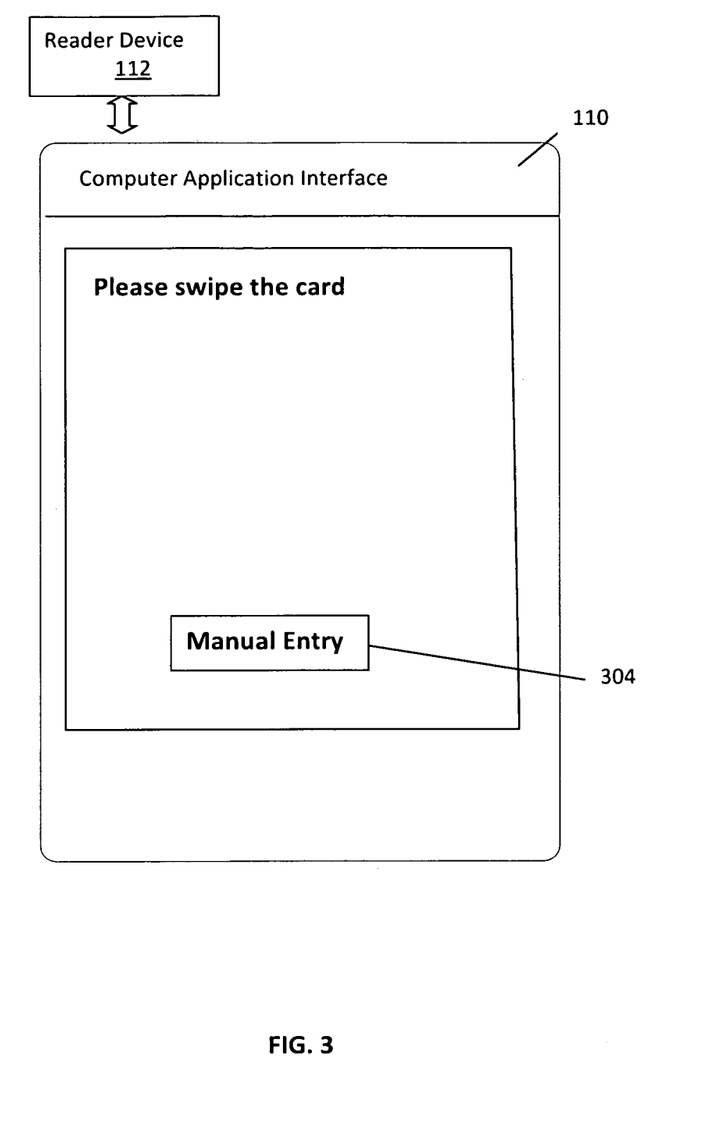
FIG. 3 illustrates an exemplary screenshot depicting an interface associated with a mobile device, according to various aspects of the invention.

In some implementations, an account holder may have made an online purchase from an Etailor's website using mobile device 110, for example. In some implementations, the online purchase may have a payment amount associated with it (i.e., payment amount associated with the item(s) purchased). In some implementations, the mobile application executed by the mobile device 110 may prompt the account holder to select the type of payment (for example, debit) for the online purchase (i.e., to cover the payment amount). In some implementations, in response to selection for debit payment, the mobile application may prompt the account holder to swipe his/her payment card (for example, debit card) using the reader device 112 coupled to the mobile device 110. First identification information (e.g., a payment card number, expiration date, card security code, and/or other information) may be read and encrypted by the reader device 112. The reader device 112 may provide the encrypted first identification information to the mobile application. In some implementations, in response to a proper swipe, the mobile application may cause a payment card swipe successful message (depicted in FIG. 3, for example) to be displayed via an interface of mobile device 110. In some implementations, the account holder may enter the payment card number, expiration date and/or card security code manually (if the card swipe was unsuccessful, for example) by selecting the manual entry option 304. In some implementations, the mobile application may prompt the account holder to enter the PIN associated with the payment card/account (upon selection for debit payment, for example). In some implementations, the mobile application may communicate the PIN to reader device 112. Reader device 112 may encrypt the PIN and provide the encrypted PIN to the mobile device 110. In some implementations, the mobile application may cause the encrypted first identification information, the encrypted PIN and the payment amount associated with the payment transaction to be communicated to adaptive payment server 130.

Upon receipt of the encrypted first identification information and the encrypted second identification information, system 100 may initiate authentication and/or processing of the payment transaction (for example, the online purchase transaction, funds transfer transaction, and/or other payment transaction). The initiation may include, among other things, authorizing and/or settling the payment transaction with various financial networks, sending the first and the second identification information to a remote server for further payment processing, and/or taking other actions to initiate authentication and/or payment of the payment transaction.

According to various implementations of the invention, adaptive payment server 130 may be communicably coupled to a variety of financial networks, financial institutions, and/or other entities that authorize and settle payment transactions using payment cards. In this manner, adaptive payment server 130 may provide processing of payment transactions using a robust array of payment devices and the respective financial institutions that issue, authorize, and settle payments originating from use of the payment devices.

Upon receiving the encrypted first identification information and/or encrypted second identification information, adaptive payment server 130 may cause communication of a confirmation page that indicates receipt of the first identification information and/or second identification information to mobile device 110. In some implementations, the confirmation page may include the payment amount associated with the payment transaction. In some implementations, the computer application executed by mobile device 110 may cause the confirmation page to be displayed via an interface of the mobile device 110.

In some implementations, adaptive payment server 130 may generate a transaction identifier for the payment transaction. The transaction identifier may be one or more words, characters, numbers, and/or other identifier that may identify the payment transaction. Furthermore, the transaction identifier may be written, typed, and/or spoken. In this manner, the transaction identifier may be used to identify the payment transaction to the account holder and/or other entity.

For example, according to an implementation of the invention, adaptive payment server 130 may communicate the transaction identifier to mobile device 110, thereby allowing the account holder or other entity using mobile device 110 to identify the payment transaction in future communications. According to various implementations of the invention, the confirmation page described above may include the transaction identifier. According to various implementations of the invention, the transaction identifier may be stored using database 140 for later retrieval by adaptive payment server 130.

In some implementations, adaptive payment server 130 may determine whether the payment transaction is authorized based on the first identification information and/or second identification information. In some implementations, adaptive payment server 130 may decrypt the first identification information and the second identification information. In some implementations, adaptive payment server 130 may determine a payment account associated with the decrypted first identification information. In some implementations, the payment account may include a bank account, debit account, and/or other account associated with the account holder. According to various implementations of the invention, adaptive payment server 130 may query database 140 to identify the payment account based on the decrypted first identification information.

In some implementations, database 140, which may include information related to a payment account, such as, for example, credit card numbers, debit card numbers, account holder contact information, account holder information, an identity of mobile device 110 used by the account holder (for example device identifier), and/or other information. In some implementations, database 140 may store the first identification information and the second identification information along with the payment account information. In some implementations, database 140 may store the encrypted second identification information. In some implementations, the second identification information and/or the encrypted second identification information may be removed from database 140 when no longer needed in order to maintain security of the second identification information. According to various implementations of the invention, examples of database 140, include, for instance, a relational database, a filesystem, and/or other device or data representation configured for data storage.

According to various implementations of the invention, adaptive payment server 120 may authenticate identification of the payment account based on the second identification information. In other words, based on the second identification information (e.g., PIN information) received from mobile device 110, adaptive payment server 120 may ensure that the payment account belongs to the account holder. In some implementations, adaptive payment server 120 may communicate with the account holder's bank to verify that the second identification information is associated with the payment account.

In some implementations, database 140 may have previously stored the first identification information and second identification information associated with the account holder (prior to receiving the first and second identification information from the mobile device 110). In some implementations, adaptive payment server 130 may query database 140 to retrieve the second identification information previously stored therein and compare the stored second identification information with the received and decrypted second identification information. In other words, the second identification information stored in database 140 may be compared to the second identification information received via mobile device 110 and decrypted by adaptive payment server 130. In response to a match, adaptive payment server 130 may determine that the payment account belongs to the account holder (i.e., identify the payment account as being authentic).

According to various implementations of the invention, in response to authenticating the identification of the payment account, adaptive payment server 130 may determine that the payment transaction is authorized. In some implementations, in response to the authorization, adaptive payment server 130 may initiate a debit of the payment amount from the identified payment account.

In some implementations, adaptive payment server 130 may communicate a sale receipt for the payment transaction to the account holder. In some implementations, adaptive payment server 120 may retrieve the transaction identifier associated with the payment transaction and include the transaction identifier in the sales receipt. The sales receipt may indicate that the payment transaction is approved (authorized) and the payment amount for which the payment transaction is approved.

In some implementations, when an indication is provided to the account holder that the payment card swipe has been successful, the mobile application executed by the mobile device 110 may prompt the account holder to select a communication method via which the account holder would like to receive the sale receipt. For example, the account holder may be prompted to enter a telephone number, an email address, and/or any other communication method. The sale receipt may be communicated by electronic mail if the account holder entered an email address. The sale receipt may be communicated by an SMS (short message service) if a telephone number is entered.

In some implementations, adaptive payment server 130 may process a payment transaction by generating an EFT request to an EFT payment network. Upon processing the payment transaction, adaptive payment server 130 communicates a result of the payment transaction to mobile device 110, which presents the results.

In some implementations of the invention, the payment transaction may be processed via an EFT network. In these implementations, processing the payment transaction may include generating a funds transfer request or balance inquiry request to an EFT provider (via EFT provider computer 150) such as, without limitation, SHAZAM, NYCE, PULSE, STAR, INTERLINK, and/or other entity that provides EFTs. In these implementations, adaptive payment server 130 may communicate an EFT request associated with the financial account based on the first identification information and the second identification information. In some implementations of the invention, the EFT request may include, without limitation, an ISO 8583 payment message supported by various EFT networks. As would be appreciated, each network may adapt the ISO 8583 standard for its own use with custom fields and custom usages. As would be further appreciated, the placement of fields in different versions (such as 1987, 1993 and 2003) of the standard varies. In some implementations, one EFT network may act as a gateway to other EFT networks to provide universal coverage.

In some implementations, adaptive payment server 130 may cause the amount of funds to be transferred based on the EFT request. In some implementations of the invention, the EFT is processed by or otherwise fulfilled by an EFT provider (such as via EFT provider computer 150).

In some implementations of the invention, adaptive payment server 130 may receive an indication of an amount of funds (for example, payment amount) to be transferred. In these implementations, adaptive payment server 130 may receive a target account identifier that indicates a target account to which the amount of funds should be transferred. In some implementations, adaptive payment server 130 may cause the amount of funds to be transferred from the payment account to the target account. Adaptive payment server 130 may do so by generating, for example, an EFT request that indicates the payment account, the target account, the PIN, and amount of funds to be transferred.

In some implementations of the invention, adaptive payment server 130 may process a balance inquiry of a financial account associated with the account holder based on the decrypted first identification information and the decrypted second identification information. In some implementations of the invention, the balance inquiry is requested from an EFT provider via EFT provider computer 150. In some implementations of the invention, adaptive payment server 130 may determine a balance of the financial account based on the balance inquiry. For example, in response to the balance inquiry, adaptive payment server 130 may request and receive a current balance of the financial account associated with the identifier. Unlike a determination of whether a financial account has sufficient funds or credit to cover a particular purchase or withdrawal amount, the balance inquiry provides an actual balance (i.e. total funds available for an asset account or a current total available credit for a credit account). Thus, according to various implementations of the invention, the balance may indicate a total purchasing power associated with the financial account. In this manner, credit or withdrawal amount decisions may be based on the balance.

In some implementations of the invention, adaptive payment server 130 may receive an account type for the financial account. In these implementations, the balance inquiry may be based on the account type. In some implementations of the invention, the account type may be received in a manner similar to the identifier as described above. For example, in some implementations, a user may input the account type using mobile device 110 and/or client computing device communicably coupled to mobile device 110. In some implementations, the account type may be stored using mobile device 110, into a payment device, or other device used to identify a financial account so that the account type does not need to be input.

In some implementations of the invention, the account type may include a credit/debt account. In these implementations, the balance inquiry may include a credit available for the credit/debt account.

In some implementations of the invention, the account type may include an asset account. In these implementations, the balance inquiry may include a balance (i.e., available funds or assets) of the asset account.

In some implementations of the invention, adaptive payment server 130 may process a balance inquiry via a network of member financial institutions. In these implementations, the member financial institutions may have agreed to provide balance inquiry services through an EFT provider. In some implementations of the invention, EFT provider computer 150 may expose a webservice or other data service that processes balance inquiries or EFTs for one or more member financial institutions based on account identifiers. In these implementations, adaptive payment server 120 may request balance inquiries from EFT provider computer 150. In some implementations, EFT provider computer 150 requires authentication in order to accept balance inquiry requests. These implementations are typically, but not necessarily, associated with financial accounts having PIN or other authentications to authenticate access to the financial account. In other implementations, authentication may not be required to process balance inquiries. These implementations are typically, but not necessarily, associated with financial accounts that do not require PINS.

In some implementations of the invention, upon completion of a transaction, a receipt may be communicated to the customer/account holder. In some implementations, the receipt may be communicated via SMS text or electronic mail. In some implementations, the receipt may include various transaction data such as, without limitation, a name of the retailer where the transaction was processed, a location/address of the retailer, an account identifier such as a card number, a terminal number where the transaction was processed, a date, a time, a sequence number or other transaction identifier, a type of transaction (such as "purchase"), a monetary amount of the transaction, a ledger balance associated with the account, and an available balance associated with the account.

In some implementations of the invention, mobile device 140, adaptive payment server 130, or other client computing device may store a history of transactions. The history may include, without limitation, a phone number, an account identifier such as a card number, a date, a time, a sequence number, a type of transaction (such as "purchase"), a monetary amount of the transaction, and a response indicator (such as "text response"). In this manner, an account holder or other operators of these devices may have a log of transactions in the event that a particular transaction is questioned.

In some implementations, adaptive payment server 130 may include a processor 132, a memory 135, and/or other components that facilitate the functions of adaptive payment server 130. In some implementations, processor 132 includes one or more processors configured to perform various functions of adaptive payment server 130. In some implementations, memory 135 includes one or more tangible (i.e., non-transitory) computer readable media. Memory 135 may include one or more instructions that when executed by processor 132 configure processor 132 to perform functions of adaptive payment server 130. In some implementations, memory 135 may include one or more instructions stored on tangible computer readable media that when executed at a remote device, such as mobile device 110, cause the remote device to perform various functions of the remote device described herein and to facilitate interaction with adaptive payment server 130, as described herein.

Figure 4:
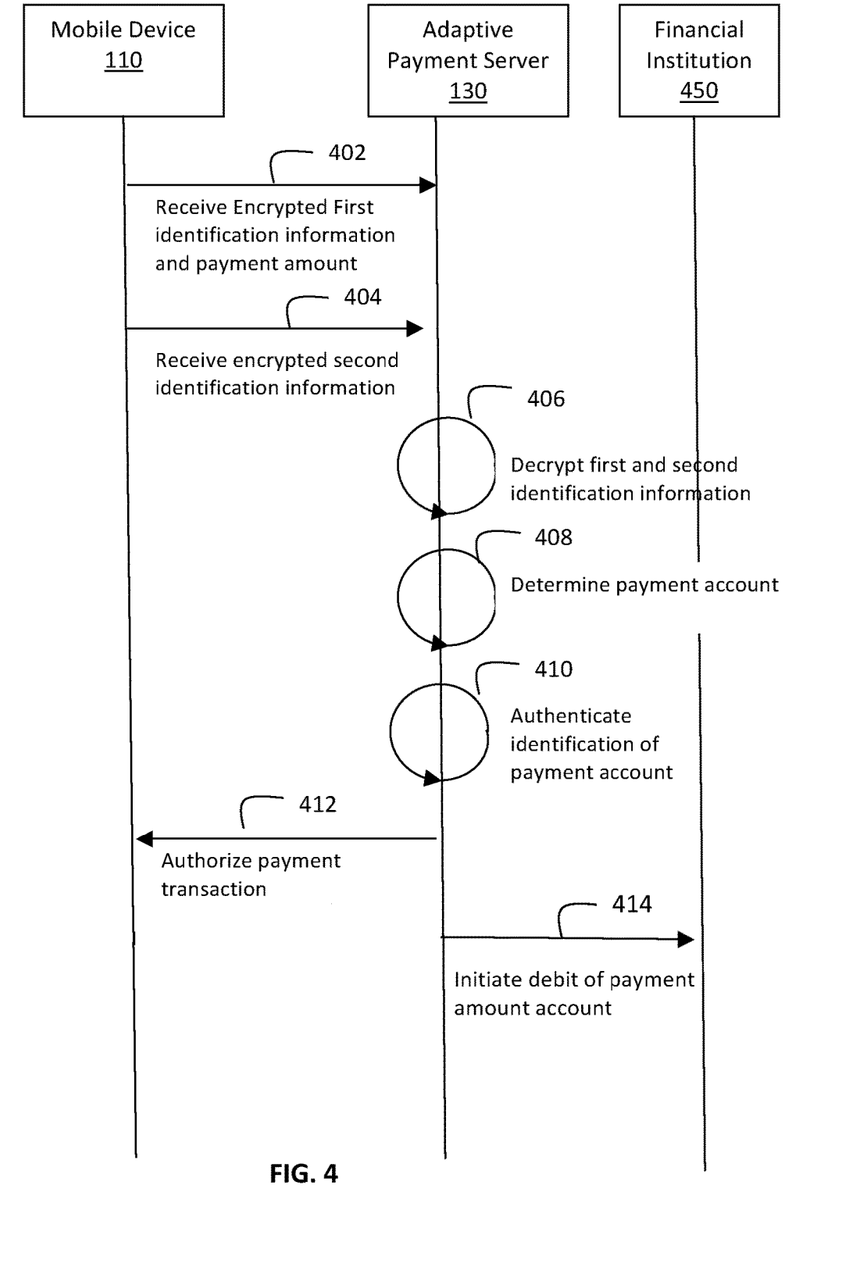
FIG. 4 is a data flow diagram illustrating an example flow of data of a system for processing payment transactions according to various implementations of the invention.

FIG. 4 is a data flow diagram illustrating exemplary process relationships in a system for processing payment transactions, according to various implementations of the invention. Adaptive payment server 130 may receive encrypted first identification information (for example, payment card number) from mobile device 110 in operation 402. In some implementations, adaptive payment server 130 may receive payment amount associated with a payment transaction along with the encrypted first identification information in operation 402. In some implementations, adaptive payment server 130 may receive encrypted second identification information (for e.g., PIN) from mobile device 110 in operation 404.

In some implementations, in an operation 406, adaptive payment server 130 may decrypt the first identification information and the second identification information. In some implementations, in an operation 408, adaptive payment server may determine a payment account associated with the account holder based on the decrypted first identification information. In some implementations, adaptive payment server 130 may authenticate the identified payment account, in operation 410. In some implementations, adaptive payment server 130 may authenticate the identified payment account based decrypted second identification information.

In some implementations, adaptive payment server 130 may authorize the payment transaction and communicate the authorization (in the form of a sales receipt, for example) to mobile device in operation 412. In some implementations, in an operation 414, adaptive payment server 130 may provide a request to initiate a debit of the payment amount from the payment account associated with the financial institution 450 (such as a bank) where the account holder has the payment account. In some implementations, adaptive payment server 130 may initiate a fund transfer request to an EFT provider requesting debit of the payment amount from the payment account. In some implementations, the adaptive payment server 130 may cause the payment amount to transferred based on the EFT request.

Figure 5:
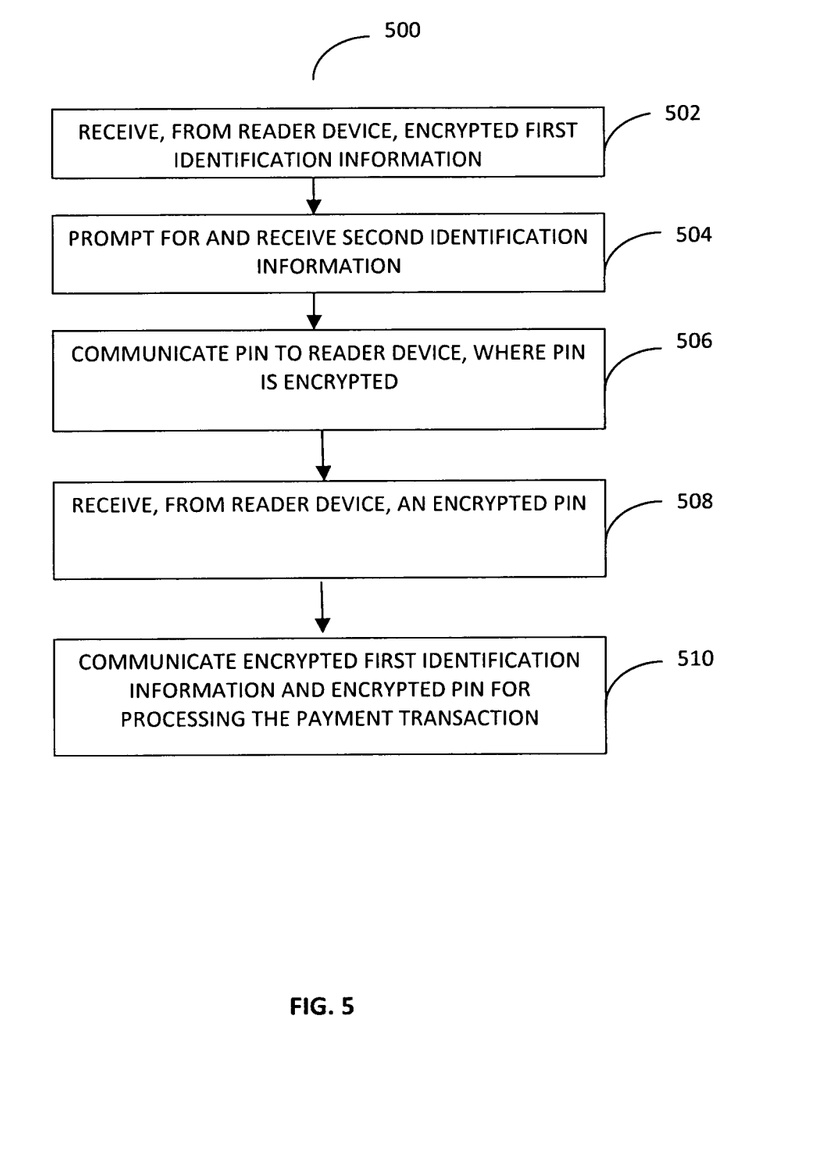
FIG. 5 is a flow diagram illustrating an example of a process of processing a payment transaction via a mobile device, according to various implementations of the invention.

FIG. 5 is a flow diagram illustrating a process 500 for processing a payment transaction via a mobile device, according to various implementations of the invention. The various processing operations and/or data flows depicted in FIG. 5 (and in the other drawing figures) are described in greater detail herein. The described operations for a flow diagram may be accomplished using some or all of the system components described in detail above and, in some implementations of the invention, various operations may be performed in different sequences. According to various implementations of the invention, additional operations may be performed along with some or all of the operations shown in the depicted flow diagrams. In yet other implementations, one or more operations may be performed simultaneously. Accordingly, the operations as illustrated (and described in greater detail below) are examples by nature and, as such, should not be viewed as limiting.

In some implementations of the invention, in an operation 502, process 500 may include receiving, from a reader device communicably coupled to the mobile device, encrypted first identification information, which identifies a payment account to be used for the payment transaction.

In some implementations of the invention, in an operation 504, process 500 may include prompting for and receiving a PIN associated with the payment account. The PIN is used to authenticate the payment transaction.

In some implementations of the invention, in an operation 506, process 500 may include communicating the PIN to the reader device, where the PIN is encrypted. In some implementations of the invention, in an operation 508, process 500 may include receiving, from the reader device, an encrypted PIN. In some implementations of the invention, in an operation 510, process 500 may include communicating the encrypted account information and the encrypted PIN for processing the payment transaction.

Figure 6:
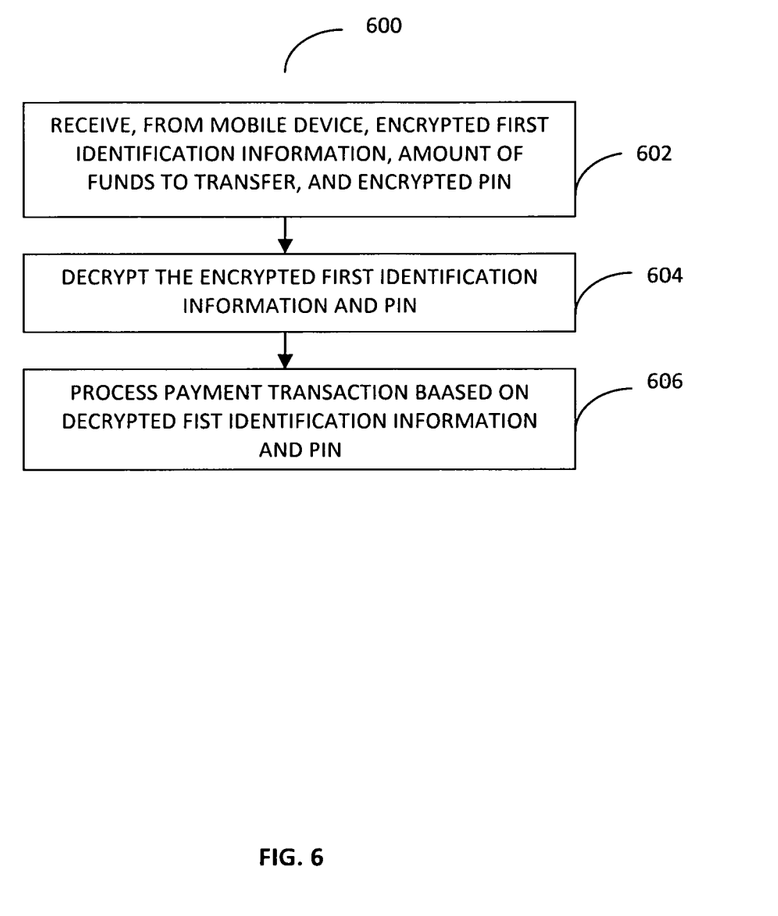
FIG. 6 is a flow diagram illustrating an example of a process of processing a payment transaction at an adaptive payment server, according to various implementations of the invention.

FIG. 6 is a flow diagram illustrating a process 600 for processing a payment transaction at an adaptive payment server using encrypted account information and encrypted PIN from a mobile device, according to various implementations of the invention.

In some implementations of the invention, in an operation 602, process 600 may include receiving, from the mobile device, encrypted first identification information that identifies a payment account, an amount of funds to transfer, and an encrypted PIN. In some implementations of the invention, in an operation 604, process 600 may include decrypting the encrypted first identification information and the encrypted PIN. In some implementations of the invention, in an operation 606, process 600 may include processing the payment transaction based on the decrypted first identification information and the decrypted PIN.

Figure 7:
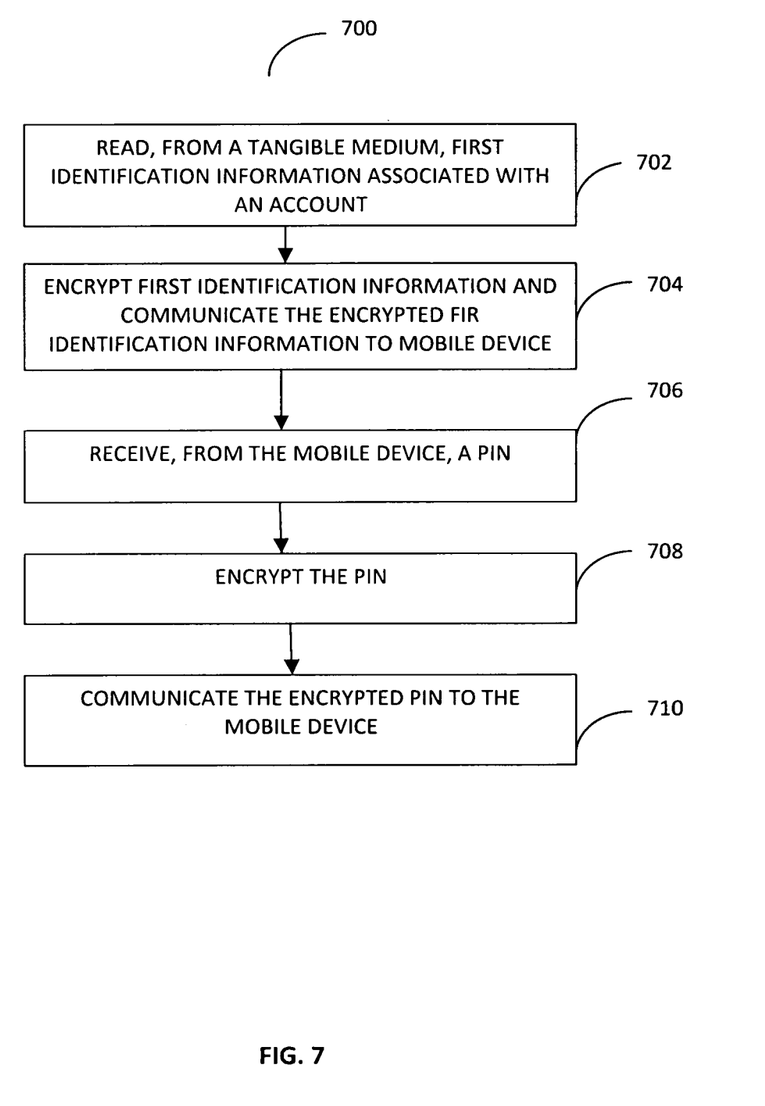
FIG. 7 is a flow diagram illustrating an example of a process of encrypting information at a reader device, according to various implementations of the invention.

FIG. 7 is a flow diagram illustrating a process 700 for encrypting first identification information and PIN at a reader device, according to various implementations of the invention.

In some implementations of the invention, in an operation 702, process 700 may include reading, from a tangible medium, first identification information associated with a payment account. In some implementations of the invention, in an operation 704, process 700 may include encrypting the first identification information and communicating the encrypted first identification information to a mobile device. In some implementations of the invention, in an operation 706, process 700 may include receiving, from the mobile device, a PIN. In some implementations of the invention, in an operation 708, process 700 may include encrypting the PIN. Various encryption algorithms such as Triple DES and AES may be used. In some implementations of the invention, in an operation 710, process 700 may include communicating the encrypted PIN to the mobile device.

As would be appreciated, some or all of the operations described in FIGS. 5-7 may be performed individually by different components (such as operations of FIG. 5 being performed by mobile device 110, operations of FIG. 6 being performed by adaptive payment server 130, or operations of FIG. 7 being performed by reader device 112), in combination by two or more components (such as operations of FIGS. 5 and 7 being performed by mobile device 110 communicably coupled to reader device 112), or may be performed as a system.

Implementations of the invention may be made in hardware, firmware, software, or any suitable combination thereof. Implementations of the invention may also be implemented as instructions stored on a machine-readable medium, which may be read and executed by one or more processors. A tangible machine-readable medium may include any mechanism for storing or transmitting information in a form readable by a machine (e.g., a computing device). For example, a tangible machine-readable storage medium may include read only memory, random access memory, magnetic disk storage media, optical storage media, flash memory devices, and other tangible storage media. Intangible machine-readable transmission media may include intangible forms of propagated signals, such as carrier waves, infrared signals, digital signals, and other intangible transmission media. Further, firmware, software, routines, or instructions may be described in the above disclosure in terms of specific exemplary implementations of the invention, and performing certain actions. However, it will be apparent that such descriptions are merely for convenience and that such actions in fact result from computing devices, processors, controllers, or other devices executing the firmware, software, routines, or instructions.

Implementations of the invention may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A mobile device for processing a payment transaction, comprising:
    a reader device; and
    a processor communicably coupled to the reader device and configured to:
        receive, from the reader device, encrypted first identification information, wherein the first identification information identifies an account to be used for the payment transaction,
        prompt a user for and receive, from the user, a Personal Identification Number ("PIN") associated with the account, the PIN being used to authenticate the payment transaction, the PIN entered by the user via keys of the mobile device,
        communicate the PIN to the reader device, wherein the PIN is encrypted by the reader device,
        receive, from the reader device, an encrypted PIN,
        communicate, to a payment server, the encrypted first identification information, the encrypted PIN, and a payment amount for processing the payment transaction,
        receive, from the payment server, an authorization for the payment transaction, wherein the authorization is based on the encrypted first identification information and the encrypted PIN, and wherein the payment server initiates a debit of the payment amount from the account in response to the encrypted first identification information and the encrypted PIN, thereby processing the payment transaction.

2. The mobile device of claim 1, wherein the mobile device is communicably coupled to the reader device via a wired or wireless link.

3. The mobile device of claim 1, further comprising a headphone jack, wherein the mobile device is communicably coupled to the reader device via the headphone jack.

4. The mobile device of claim 1, wherein the processor configured to communicate, to a payment server, the encrypted first identification information, the encrypted PIN, and a payment amount for processing the payment transaction comprises the processor configured to communicate the encrypted first identification information, the encrypted PIN, and the payment amount for processing the payment transaction via an electronic funds transfer ("EFT") request.

5. A method for processing a payment transaction via a mobile device, the method comprising:
   receiving, at the mobile device and from a reader device communicably coupled to the mobile device, encrypted first identification information, wherein the first identification information identifies an account to be used for the payment transaction;
   prompting, by the mobile device, a user for a Personal Identification Number ("PIN") associated with the account, the PIN being used to authenticate the payment transaction;
   receiving, by the mobile device, the PIN from the user via keys of the mobile device;
   communicating, by the mobile device, the PIN to the reader device, wherein the PIN is encrypted by the reader device;
   receiving, by the mobile device and from the reader device, the encrypted PIN;
   communicating, by the mobile device and to a payment server, the encrypted first identification information, the encrypted PIN, and a payment amount for processing the payment transaction;
   receiving, by the mobile device and from the payment server, an authorization for the payment transaction, wherein the authorization is based on the encrypted first identification information and the encrypted PIN; and
   sending, by the mobile device, a debit request of the payment amount from the account based on the authorization to a financial institution of the payment account.

6. The method of claim 5, wherein the mobile device is communicably coupled to the reader device via a wired or wireless link.

7. The method of claim 5, further comprising a headphone jack, wherein the mobile device is communicably coupled to the reader device via the headphone jack.

8. The method of claim 5, wherein communicating, by the mobile device and to a payment server, the encrypted first identification information, the encrypted PIN, and a payment amount for processing the payment transaction comprises comprises communicating the encrypted first identification information, the encrypted PIN, and the payment amount for processing the payment transaction via an electronic funds transfer ("EFT") request.

* * * * *